(12) United States Patent
Wailly et al.

(10) Patent No.: US 10,540,499 B2
(45) Date of Patent: Jan. 21, 2020

(54) METHOD FOR MONITORING THE SECURITY OF A VIRTUAL MACHINE IN A CLOUD COMPUTING ARCHITECTURE

(71) Applicant: Orange, Paris (FR)

(72) Inventors: Aurélien Wailly, Berat (FR); Pascal Legouge, Issy les Moulineaux (FR)

(73) Assignee: ORANGE, Paris (FR)

( * ) Notice: Subject to any disclaimer, the term of this patent is extended or adjusted under 35 U.S.C. 154(b) by 213 days.

(21) Appl. No.: 15/317,910

(22) PCT Filed: Jun. 10, 2015

(86) PCT No.: PCT/FR2015/051527
§ 371 (c)(1),
(2) Date: Dec. 9, 2016

(87) PCT Pub. No.: WO2015/189519
PCT Pub. Date: Dec. 17, 2015

(65) Prior Publication Data
US 2017/0124326 A1 May 4, 2017

(30) Foreign Application Priority Data

Jun. 11, 2014 (FR) .................................. 14 55312

(51) Int. Cl.
*H04L 29/06* (2006.01)
*G06F 21/56* (2013.01)
(Continued)

(52) U.S. Cl.
CPC ........ *G06F 21/566* (2013.01); *G06F 9/45558* (2013.01); *G06F 21/554* (2013.01);
(Continued)

(58) Field of Classification Search
CPC .................................................... G06F 21/566
See application file for complete search history.

(56) References Cited

U.S. PATENT DOCUMENTS 8,296,759 B1 * 10/2012 Hutchins ............. G06F 9/45558
709/223
8,321,863 B2 * 11/2012 Yamaguchi ......... G06F 9/45558
717/170
(Continued)

OTHER PUBLICATIONS

Chen et al: "When virtual is better than real", Hot Topics in Operating Systems, 2001. Proceedings of the Eighth Workshop on May 20-22, 2001, IEEE, Piscataway, NJ, May 20, 2001, pp. 133-138.

(Continued)

*Primary Examiner* — Shawnchoy Rahman
(74) *Attorney, Agent, or Firm* — Knobbe, Martens, Olson & Bear, LLP

(57) ABSTRACT

One embodiment relates to a method for monitoring the security of a virtual machine hosted by a host system, the virtual machine comprising an operating system communicating with a hypervisor of the host system. The hypervisor interfaces between the operating system and hardware resources of the host system. The method comprises receiving at least one machine instruction corresponding to an interruption in the operating system, said interruption following an event having occurred in the virtual machine and executing the instruction by the hypervisor using the hardware resources of the host system and transmitting to the operating system a data stream including the result of the execution. The sent data stream is duplicated in a second stream and the second stream is analyzed by a security agent running on an entity separate from the virtual machine in order to detect a security problem during the processing of the interruption.

6 Claims, 2 Drawing Sheets

(51) Int. Cl.
    *G06F 21/55*      (2013.01)
    *G06F 9/455*      (2018.01)
(52) U.S. Cl.
    CPC .............. *G06F 2009/45587* (2013.01); *G06F 2009/45591* (2013.01)

(56) References Cited

U.S. PATENT DOCUMENTS

| | | | |
|---|---|---|---|
| 9,697,356 B2 * | 7/2017 | Margalit | ............... G06F 21/561 |
| 2008/0222729 A1 | 9/2008 | Chen et al. | |
| 2008/0320594 A1 | 12/2008 | Jiang | |
| 2010/0191845 A1 * | 7/2010 | Ginzton | ................ G06F 9/4856 |
| | | | 709/224 |
| 2013/0055396 A1 * | 2/2013 | Wang | ..................... G06F 21/53 |
| | | | 726/24 |

OTHER PUBLICATIONS

Onoue et al: "Control of system calls from outside of virtual machines", Proceedings of the 2008 ACM Symposium on Applied Computing, SAC '08, Fortaleza, Ceara, Brazil, Mar. 16, 2008, New York, pp. 2116-1221.

International Search Report dated Aug. 26, 2015 for International Application No. PCT/FR2015/051527 filed Jun. 10, 2015, 8 pages.

Written Opinion dated Aug. 26, 2015 for International Application No. PCT/FR2015/051527 filed Jun. 10, 2015, 10 pages.

\* cited by examiner

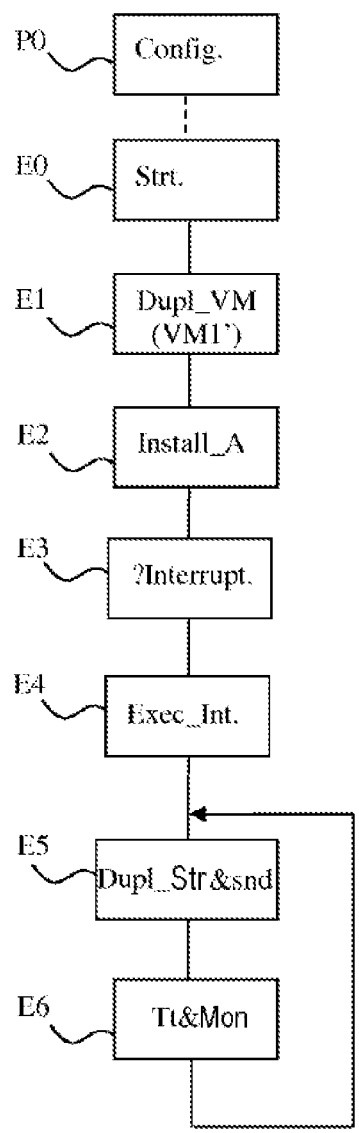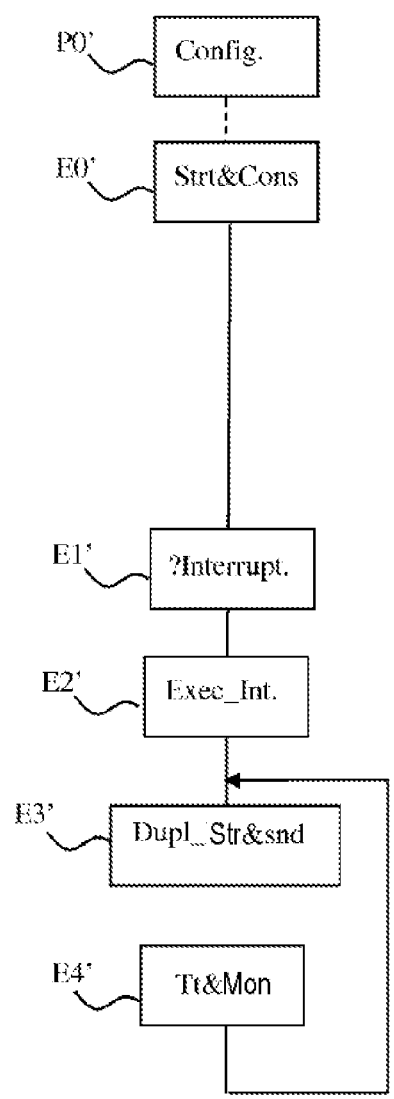
Figure 2
Figure 3

METHOD FOR MONITORING THE SECURITY OF A VIRTUAL MACHINE IN A CLOUD COMPUTING ARCHITECTURE

RELATED APPLICATIONS

This application is the U.S. National Phase of Application No. PCT/FR2015/051527 entitled "METHOD FOR MONITORING THE SECURITY OF A VIRTUAL MACHINE IN A CLOUD COMPUTING ARCHITECTURE" filed Jun. 10, 2015, which designated the United States, and which claims the benefit of French Application No. 1455312 filed Jun. 11, 2014.

The present invention concerns a method of monitoring the security of a virtual machine in a virtualized computing environment, that is to say one that has been rendered virtual.

It finds a particularly beneficial application in making secure computer systems with an architecture based on dematerialized computing resources made available to users who access them remotely. An architecture of this kind is better known in English as a "cloud computing" architecture. The cloud computing concept designates computing architectures in which the computing processes traditionally localized on user workstations or servers of a business are transferred to remote servers.

A cloud computing architecture usually includes a local client access platform adapted to access one or more services by means of a subscription to a cloud computing service. The local access platform is for example a computer or a mobile terminal used by the client to access the service via a network, for example the Internet. The architecture also includes a remote platform on a host server that provides the hardware resources the cloud computing service uses, a client database adapted to manage the services to which clients subscribe, and a network adapted to enable access by the client to the services to which they subscribe. The service offer is proposed by a cloud services provider who manages the remote platform and the client database. The service provider makes available to the client one or more virtual machines that constitute the execution environment for the client's service. The virtual machine or machines is/are executed using the resources of the host server.

When a client wishes to subscribe to a cloud computing service offered by a service provider, they define the service to which they wish to subscribe in the form of a configuration of the resources of a virtual machine. For example, the configuration of the virtual machine is defined in the form of a number of processors, a memory size, a type of memory card, etc. Once the configuration has been established, the virtual machine is stored in the client database by the service provider in the form of a configuration file. When the client wishes to execute the virtual machine in order to access the service they subscribe to, the virtual machine is started by the service provider on the host server. The client then executes the service they subscribe to from the local access platform, as if the service were installed locally. They use the resources of the execution platform, however.

It is known that security is critical in any computing network architecture and a cloud computing architecture is no exception to this rule. Where managing the security of a cloud computing service is concerned, it is standard practice to employ a security agent. A security agent consists of an autonomous software module installed on a system to be protected, here on a virtual machine, and responsible for monitoring security with a view to detecting or even remedying security problems. A security problem on a virtual machine consists for example in the presence of a virus, unauthorized access by a program to a memory area, etc.

In the case of a client subscribing to a cloud computing service, the security agent may be defined by the client and form part of the initial configuration of the virtual machine. The agent is for example a known anti-virus program. The security agent is therefore controlled by the client. On the other hand, it is often limited to a certain functionality, in this case virus detection. In another embodiment, the security agent may be offered by the service provider and handle diverse security aspects. The service provider then installs the agent on the virtual machine of the client when starting it in the execution environment. However, clients may be hesitant to integrate into their virtual machine agents of this kind that they do not control. For example, they may fear that the protection of the confidentiality of their data is not guaranteed. The same clients nevertheless wish to increase the security level of their virtual machine.

Present-day techniques for making virtual machines secure based on security agents are not able to satisfy completely the requirements of clients in terms of security.

One object of the invention is to remedy the insufficiencies/disadvantages of the prior art and/or to improve on the prior art.

To this end, the invention proposes a method for monitoring the security of a virtual machine hosted by a host system, the virtual machine including an operating system communicating with a hypervisor of the host system, said hypervisor interfacing between the operating system and hardware resources of the host system, said method including the following steps executed by the hypervisor:
  receiving from the operating system at least one machine instruction corresponding to an interrupt in the operating system, said interrupt following an event that has occurred in the virtual machine,
  the hypervisor executing the instruction using the hardware resources of the host system and sending to the operating system a data stream including the result of the execution, characterized in that the sent data stream is duplicated in a second stream and the second stream is analyzed by a security agent executed on an entity separate from the virtual machine in order to detect a security problem during the processing of the interrupt.

The method described makes it possible to monitor the security of a virtual machine of a client in a non-intrusive manner. In fact, the hypervisor, which is interfaced between the operating system and the hardware resources of the host system to provide the virtual machine with virtualized resources, following an interrupt in the operating system of the virtual machine, receives a stream of data resulting from the processing of the interrupt in the hardware resources. The hypervisor duplicates this stream. It sends this stream to the operating system of the virtual machine of the client, which corresponds to normal processing of the interrupt, and a security agent analyzes the duplicated stream. The security agent is therefore unable to compromise the virtual machine of the client since it monitors a duplicated stream, independent of the stream sent to the virtual machine of the client. The service provider can therefore make a new security offer to clients who are guaranteed that their virtual machine will not be impacted by the security agent that is used.

In one embodiment, the monitoring method includes a step of duplicating the virtual machine as a duplicated virtual machine and a step of installing the security agent on the duplicated virtual machine, the second stream being sent to the operating system of the duplicated machine to preserve in the duplicated virtual machine a correct image of the virtual machine.

In this embodiment, the virtual machine of the client is duplicated in memory and the security agent is installed on the duplicated machine by the hypervisor. The duplicated virtual machine, which is on different memory pages from the virtual machine of the client, is therefore completely independent of the virtual machine of the client. Following an interrupt in the operating system of the virtual machine of the client, it receives the same stream of data as the virtual machine of the client and impacts the virtual input/output peripherals in the same manner as the virtual machine of the client. It therefore behaves in the same manner as the virtual machine of the client without any information being exchanged between the virtual machine of the client and the duplicated machine. Likewise, there is no load sharing or redundancy between the two virtual machines. The client is therefore guaranteed the complete independence of their virtual machine from the security agent offered by the service provider. The duplication of the virtual machine of the client is a known and fully mastered process that is not costly for the service provider in terms of processing time and complexity. The solution is therefore easy to implement.

In another embodiment, the security agent is executed in the same execution layer as the hypervisor, said security agent constructing a representation of the virtual machine from the second stream.

In this embodiment, the security agent itself constructs a representation in memory of the part of the virtual machine of the client that it monitors. It does this when the virtual machine is started or restarted. This embodiment has the advantage of being less costly in terms of memory space than the solution previously described. In fact, it does not necessitate complete duplication in memory of the virtual machine of the client. The complexity of the agent in terms of processing is greater, however, because it is the agent that constructs a representation of the virtual machine as a function of the events that it has to monitor.

The stream duplication, stream sending and instruction execution steps are advantageously executed atomically.

The atomic character of the steps of duplicating and sending the stream and executing the instruction associated with the interrupt guarantees that the security agent at all times monitors exactly the same events as those occurring on the virtual machine of the client, whether that be on the basis of the representation of the virtual machine that it has constructed or on the basis of the duplicated machine. In fact, no desynchronization occurs between the virtual machine of the client and the constructed representation of the virtual machine or the duplicated machine.

The invention also concerns a device for monitoring the security of a virtual machine hosted on said device and including an operating system communicating with a hypervisor of the host system, said hypervisor interfacing between the operating system and hardware resources of the host system, said device including:
  receiving means for receiving from the operating system at least one associated machine instruction corresponding to an interrupt in the operating system, said interrupt following an event that has occurred in the virtual machine,
  execution and sending means for executing said instruction using the hardware resources of the host system and sending to the operating system a stream including the result of the execution,
  duplication means adapted to duplicate the received stream as a second stream,
  a security agent adapted to be executed on an entity separate from the virtual machine and to analyze the second stream in order to detect a security problem when processing the interrupt.

In one embodiment, the monitoring device further includes:
  second duplication means adapted to duplicate the virtual machine as a duplicated virtual machine, and
  installation means adapted to install the security agent on the duplicated virtual machine.

The invention also concerns a security monitoring system including:
  a security monitoring device according to the invention,
  the virtual machine,
  a duplicated virtual machine intended to host the security agent.

The invention also relates to a computer program on a data medium and loadable into the memory of a computer, the program including code instructions for the execution of the steps of the security monitoring method according to the invention when the program is executed on said computer.

The invention also concerns a data medium on which is stored the program according to the invention.

Other features and advantages of the present invention will become clearer from the description and the appended drawings, in which:

FIG. 2 shows the steps of the method according to a first embodiment of the invention of secure configuration of a sensitive application in a mobile terminal;

FIG. 3 shows the steps of the method according to a second embodiment of the invention of secure configuration of a sensitive application in a mobile terminal;

Figure 1:
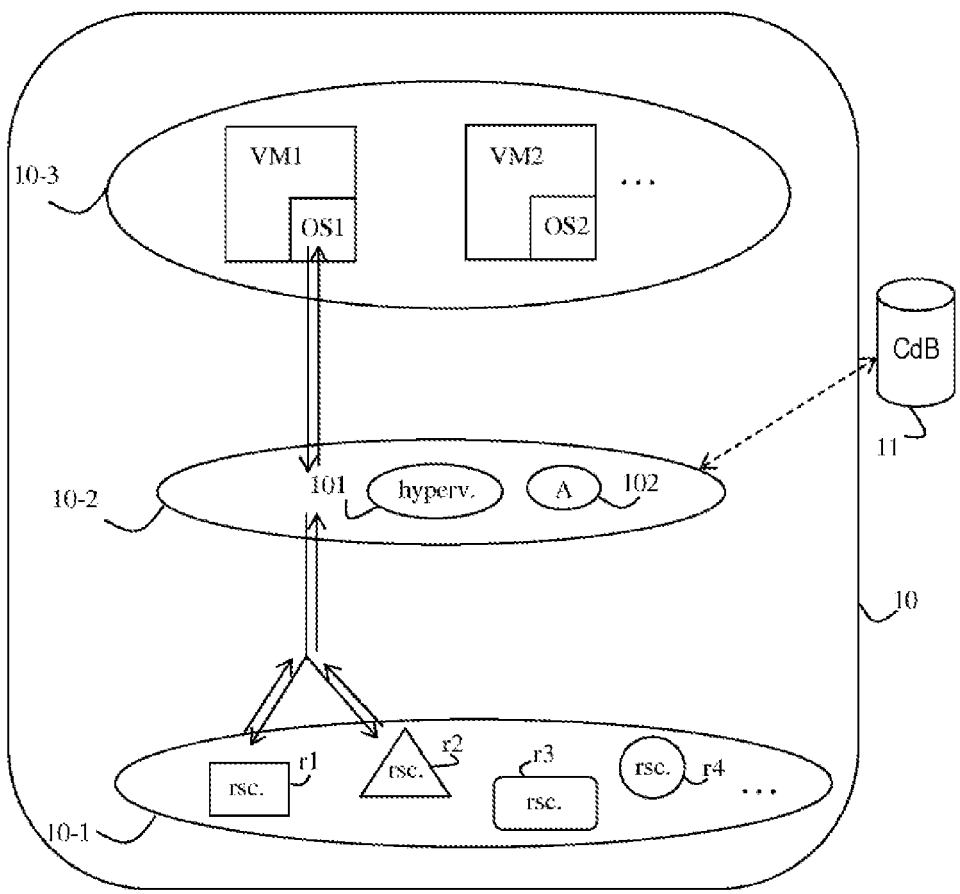
FIG. 1 is a diagrammatic representation of a cloud computing architecture model adapted to implement the security monitoring method according to one embodiment of the invention.

An architecture model suitable for implementing a security monitoring method according to one embodiment of the invention will now be described with reference to FIG. 1.

A cloud computing architecture usually conforms to a model that includes a plurality of execution layers. Various models exist. One example of a cloud computing architecture model for an architecture that includes a host server 10 is described with reference to FIG. 1.

Thus the host server 10 includes a first execution layer or hardware execution layer 10-1. This hardware execution layer 10-1 includes a set of hardware resources r1, r2, r3, r4, etc. of the host server 10. A hardware resource corresponds for example to memory, a network interface, a microprocessor, etc. A second execution layer is a virtualization layer 10-2. The virtualization layer 10-2 is adapted to offer to operating systems OS1, OS2, etc. of virtual machines VM1, VM2, etc. a virtual layer 10-3, a virtual resources space, constructed on the basis of a physical resources space of the host server 10, here the space of the resources r1, r2, r3, r4, etc. of the hardware execution layer 10-1. The virtualization layer 10-2 is implemented by a virtualization module usually called a hypervisor 101 that manages the allocation of hardware resources between different instances of virtual machines and makes those virtualized resources available to the virtual machines. In particular the hypervisor 101 manages the access of the operating systems OS1, OS2, etc. of the virtual machines VM1, VM2, etc. to the underlying hardware architecture. The virtualization layer 10-2 is also adapted for the creation, instantiation, release, placement of the virtual machines VM1, VM2, etc., executed concurrently on the same physical machine, here the host server 10. Finally, a third execution layer is the virtual layer 10-3. The resources associated with this layer are the virtual machines VM1, VM2, etc. that are executed in the virtual environment made available by the host server 10 as a physical machine. The virtual machines are for example virtual machines of clients that may contain sensitive code or data to be protected.

According to the embodiment described, the virtualization layer 10-2 includes a security agent 102 adapted to analyze events that occur in a virtual machine and to detect any abnormal behavior when the security agent 102 is associated by the hypervisor 101 with the virtual machine. An abnormal behavior is for example access by a program that is executed in the virtual machine to a memory area that is normally not accessed by that program, the presence of a virus, suspect network instructions targeting the virtual machine or emanating from it, etc. If the security agent 102 detects an abnormal behavior in the virtual machine with which it is associated, it sends information relating to that abnormal behavior to an analyzer (not represented in FIG. 1). The analyzer is adapted to analyze the events detected as abnormal, where applicable to alert the client to whom the virtual machine belongs and where applicable to implement countermeasures. Note that the security agent 102 does not implement any countermeasures on the virtual machine with which it is associated. It is responsible only for monitoring events. The security agent 102 is configured to monitor one or more types of events on the virtual machine. For example, it can be configured to detect the presence of a virus, to detect access by a program to a memory area that the program is not authorized to access, to detect suspect network instructions, etc. The security agent 102 is an autonomous software module intended to be associated with a virtual machine by the hypervisor 101.

When a virtual machine is started up and is being executed, an action in the virtual machine, for example the movement of the mouse by a user, the saving of a file, is managed in the conventional manner by the operating system of the virtual machine in the form of an interrupt. An interrupt consists in interrupting the normal execution of a program by the microprocessor so as to execute another program, or interrupt routine, for example the one that is intended to take account of the action of the user on the virtual machine. The interrupt routine includes machine instructions, that is to say low-level instructions, in machine language, such as assembler language. These low-level instructions involve resources, such as memory, interfaces, peripherals, etc. The hypervisor 101 that makes virtualized resources available to the virtual machine is an intermediary between the operating system of the virtual machine and the hardware resources of the hardware execution layer 10-1 of the host system 10. Accordingly, at the time of an interrupt in an operating system of a virtual machine, for example the operating system OS1 of the machine VM1, the hypervisor 101 receives the machine instructions from the operating system OS1 that involve the virtualized resources and commands the execution of those instructions using the hardware resources of the host system 10. It then sends to the operating system OS1 the result of this execution in the form of a stream of data including the result of that execution. This stream includes events addressed to virtual input/output peripherals used by the virtual machine VM1. In the case of movement of the mouse, the processing of the interrupt therefore causes the actual movement of the mouse on a screen associated with the virtual machine VM1. Execution of the interrupt routine cannot be interrupted, and the instructions of the routine are said to be executed atomically.

Just as there are different architecture models, there are also different cloud computing service offers. Thus there is known a first model, known as SaaS (from the English "Software-as-a-Service") in which a service provider makes available to the user a complete software stack, from hardware up to applications. There is known a second model known as "PaaS" (from the English "Platform-as-a-Service") in which users deploy their own applications with the aid of environments and tools made available by the service provider Finally, there is known a third model, known as "IaaS" (from the English "Infrastructure-as-a-Service") in which the service provider makes calculation, communication or storage resources available to users. Users can then deploy and execute any software, including their own operating system, which uses the resources made available in this way. In the embodiment described here, it is assumed that a client subscribes to an IaaS type offer.

The steps of a first embodiment of a method of monitoring the security of a virtual machine in a cloud computing architecture will now be described with reference to FIG. 2.

The cloud computing architecture conforms to the model described with reference to FIG. 1.

In an initial configuration phase P0, the client configures their virtual machine, for example the virtual machine VM1. To this end they specify the resources they require, in terms for example of memory size, memory card type, number of processors and network cards, virtual machine version, etc. The configuration defined in this way is in the form of a configuration file that the client sends to the service provider. The configuration received by the service provider is stored in a client database 11 as shown in FIG. 1. The client database 11 is intended to store an image of the virtual machine VM1 of the client used when first starting or subsequently restarting the virtual machine. For example, on the first starting of the virtual machine VM1 by the hypervisor 101, that is to say on creation of the virtual machine VM1 and its first implementation in the execution environment, that is to say in the host system 10, the resources specified as configuration parameters are allocated by the hypervisor to the virtual machine VM1 in the form of virtualized resources. At the time of a subsequent release of the virtual machine VM1, that is to say at the end of execution of the virtual machine VM1 in the execution environment, a memory image of the virtual machine VM1 is stored in the client database 11. The modifications made to the virtual machine VM1 by the client during the execution thereof in the execution environment are therefore taken into account on subsequently restarting.

In a step E0 of starting or restarting the virtual machine, the virtual machine VM1 is started or restarted by the service provider. This starting is a response to a starting command from the client coming from a local access platform of the client and means that the virtual machine VM1 as stored in the client database 11 is loaded by the hypervisor 101 on the host server 10 of the service provider. All the resources parametered for the machine VM1 are then supplied by the hypervisor 101 to the virtual machine VM1 for the latter to be executed according to the parameters saved in the client database 11. The client can then access their virtual machine VM1 in order to install all the software that they need for their activity.

In a first embodiment, when the virtual machine VM1 is started on the host system 10 by the hypervisor 101, in a duplication step E1 the hypervisor 101 duplicates the virtual machine VM1 of the client. This duplication consists in creating a second virtual machine VM1' identical in all respects to the virtual machine VM1 of the client. By identical is meant that the duplicated machine VM1' has the same characteristics as the virtual machine VM1 of the client: same network address, same MAC address; it has access to the same amounts of resources, etc. It is installed on different memory pages, however. The duplicated machine VM1' is therefore distinct from the virtual machine VM1.

In a step E2 of installing the agent, the security agent 102 is installed by the hypervisor 101 on the duplicated virtual machine VM1'. At the end of this installation, the security agent 101 is executed on the duplicated virtual machine VM1' and is able to monitor the execution of the duplicated virtual machine VM1' in order to detect any security problems.

In a step E3 of receiving an interrupt, following an event that has occurred in the virtual machine VM1, the hypervisor 101 receives from the operating system OS1 of the virtual machine VM1 a sequence including at least one machine instruction corresponding to an interrupt routine. To be more precise, an event in the virtual machine VM1 of the client triggers an interrupt in the operating system OS1 of the virtual machine VM1. This interrupt corresponds to the sequence of instructions. The event that causes an interrupt is for example movement of the mouse by the client, a request to save a file, etc.

In a step E4 of execution of the interrupt, the operating system OS1 of the virtual machine VM1 commands the execution of the sequence of instructions. The instructions of the sequence are executed on the virtualized resources controlled by the hypervisor who calls on the underlying hardware resources. It is therefore the hypervisor 101 that makes the virtualized resources available to the virtual machine VM1 that commands the execution of the sequence of instructions by means of the hardware resources of the host system 10. The result of the execution of this sequence of instructions constitutes a data stream intended to be sent to the virtual machine VM1.

In a stream duplication and sending step E5, the hypervisor 101 duplicates the stream intended for the virtual machine VM1 and obtains a duplicated stream. It then sends the stream in the conventional manner to the virtual machine VM1 and the duplicated stream to the duplicated virtual machine VM1', to be more precise to the respective operating systems of the virtual machines VM1, VM1'. In other words, when processing an interrupt, inputs and events coming from the processor of the host server 10 and intended for the input/output peripherals of the virtual machine VM1 that constitute the data stream are captured by the hypervisor 101 and sent to the two virtual machines VM1, VM1'.

In a processing and monitoring step E6, the virtual machine VM1 and the duplicated virtual machine VM1' are modified in accordance with the inputs and events received. The interrupt is then processed on the one hand in the virtual machine VM1 and on the other hand in the duplicated virtual machine VM1'. Clearly any modification made to the virtual machine VM1 following the processing of the interrupt is made in the same way and at the same time to the duplicated virtual machine VM1'. However, there is no load sharing or redundancy between the virtual machines since the virtual machines are completely separate, that is to say on separate memory pages. The virtual machine VM1 therefore does not suffer any edge effect because of the duplication of the stream and the processing effected on the duplicated virtual machine VM1'. Note that duplicating the stream is part of processing the interrupt. It is said to be atomic in the sense that the steps E5 of duplicating the stream and sending the stream to the virtual machine VM1 and to the duplicated virtual machine VM1' and the processing step E6 are executed in the non-interruptible phase of processing the interrupt. In parallel with this processing, the security agent 102 implemented on the duplicated machine VM1' monitors the events occurring in the operating system of the duplicated virtual machine VM1' during the processing and monitoring step E6 in order to detect any security problems. The security agent 102 is configured to monitor certain types of event. For example, in a situation in which it is configured to detect the presence of a virus, the security agent 102 monitors the behavior of the operating system of the duplicated machine VM1' and analyzes the duplicated stream received in order to detect the presence of a virus. In another example, the security agent 102 is configured to monitor network exchanges. It analyzes the duplicated stream so as to detect the presence of suspect network instructions. In another embodiment, the security agent 102 is configured to detect unauthorized access to memory areas by certain programs. It analyzes the duplicated stream and moreover knows when access is legal from tables stored in random access memory. The invention is of course not limited to the detection of one type of security problem and the security agent 102 may be configured to detect a plurality of types of problems. Any data associated with a security problem detected on the virtual machine VM1' is sent by the security agent 102 to the analyzer for analysis and where appropriate to generate an alert. The analyzer is a software module contained for example in a security virtual machine separate from the virtual machine VM1 and the duplicated virtual machine VM1'. It may be on the host server 10 or on a separate host server. The analyzer can alert the client to a security problem. It can also be adapted to apply countermeasures. Note that the security agent 102 is not able to execute any protection measures on the duplicated virtual machine VM1'. It is important for the security agent 102 to be non-intrusive. In fact, the monitoring method necessitates that the states of the virtual machine VM1 and the duplicated machine VM1' remain identical. No action can therefore be undertaken on the duplicated machine VM1' at the risk of generating a different state on the duplicated machine VM1'.

With the security monitoring solution described here, the client is certain that their virtual machine is never compromised because the security agent 102 is not installed on the virtual machine VM1 of the client.

The duplication step E5 and the processing and monitoring step E6 are iterated throughout the time during which the virtual machine VM1 of the client is executed on the host server 10, notably on each processing of an interrupt.

The invention is described here in the situation where a client subscribes to an IaaS type offer. The invention is not limited to that type of offer, however, and applies equally if a client subscribes to a PaaS or SaaS type offer. Note, however, that the security solution proposed here is particularly beneficial in the case of an IaaS architecture. In fact, with an IaaS offer, the cloud services provider makes resources available to the client and the client then installs the software they want, including the operating system. At this level, the cloud services provider has complete control of the virtual machines of the architecture and is certain to be able to deploy the security agent.

In the method described above, the virtual machine VM1 is duplicated and the security agent 102 is installed by the hypervisor 101 on the duplicated virtual machine VM1'. The invention is not limited to an embodiment of this kind. Accordingly, in another embodiment, described with reference to FIG. 3, the security agent 102 that is initially contained in the virtualization layer 10-2 remains at the same level as the hypervisor 101, that is to say in the virtualization layer 10-2, to monitor the security of the virtual machine VM1.

The method includes a configuration phase P0' identical to the configuration phase P0 described with reference to FIG. 2.

In a step E0' of starting or restarting the virtual machine VM1 and of construction, the security agent 102 constructs a representation of the virtual machine VM1 on the basis of all the events that occur in the processor and the random access memory on starting or restarting the virtual machine VM1. It is the hypervisor 101, which is responsible for the implementation of the virtual machine VM1 in the execution environment, that sends all of this information to the security agent 102. The representation of the virtual machine VM1 constructed by the security agent 102 takes account of what the security agent 102 is configured to do. Accordingly, if the agent 102 is configured to detect the presence of a virus, it constructs a knowledge base on the basis of the files present on the underlying file system and updates that base as a function of modifications made to the file system. It then operates on this knowledge base according to known methods in order to detect the presence of a virus. For example, it calculates file hashes or observes function calls. The security agent 102 thus constructs a representation of the virtual machine VM1 as a function of the events that it is charged with monitoring and for which it has been configured. Clearly the representation of the virtual machine VM1 necessitates less memory space than complete duplication of the machine VM1. At the end of the starting step E0', the security agent 102 has available in memory a representation of the virtual machine VM1.

In a step E1' of receiving an interrupt identical to the step E3 in FIG. 2 the hypervisor 101 receives from the operating system OS1 of the virtual machine VM1 a sequence including at least one instruction corresponding to an interrupt routine. The reception of the routine follows an interrupt in the operating system OS1 following an event that has occurred in the virtual machine VM1.

In a step E2' of execution of the interrupt identical to the step E4 described with reference to FIG. 1 the hypervisor 102 commands the execution of the instructions of the sequence using the hardware resources of the host system 10. The result of the execution of this sequence, intended to be sent to the operating system OS1, constitutes a data stream.

In a stream duplication and sending step E3', the hypervisor 101 duplicates the data stream intended to be sent to the virtual machine VM1 and obtains a duplicated stream. It then in the conventional manner sends the stream to the virtual machine VM1 and the duplicated stream to the security agent 102.

In a processing and monitoring step E4', the security agent 102 modifies the representation of the virtual machine VM1 that it has constructed as a function of the received duplicated data stream if that received duplicated data stream concerns a type of event that it monitors. In this case it modifies the representation of the virtual machine VM1 in the same way that the virtual machine VM1 is modified by the received stream. In parallel with and during this processing the security agent 102 monitors the events that occur in the representation of the virtual machine VM1 that it has constructed in order to detect any security problems. It therefore analyzes the duplicated stream received. If the security agent 102 is configured to detect the presence of a virus, the security agent analyzes if the data contained in the duplicated stream includes a known virus signature.

Note that duplicating the stream is part of processing the interrupt. It is said to be atomic in the sense that the stream duplication step E3' and the monitoring step E4' are executed atomically and form part of the non-interruptible phase of processing the interrupt.

This embodiment is advantageous in that it necessitates less memory space. In fact, there is no duplication of the virtual machine VM1 and therefore no requirement for memory space for the duplicated virtual machine VM1'. However, the security agent 102 is more complex. In fact, the security agent 102 must be adapted to construct a representation of the virtual machine VM1. It must moreover be adapted to modify the representation of the virtual machine VM1 each time that it receives a duplicated stream that concerns the type of event that it monitors. This complexity of the agent A may compromise the performance of the solution.

This embodiment is also highly suitable for IaaS type offers. In fact, providing a security agent adapted to monitor security on the basis of observation of resources, by monitoring the use thereof makes it easier to define a generic agent able to detect multiple types of problem. A generic agent of this kind can then be instantiated as a security agent dedicated to detecting a certain type of security problem.

Figure 4:
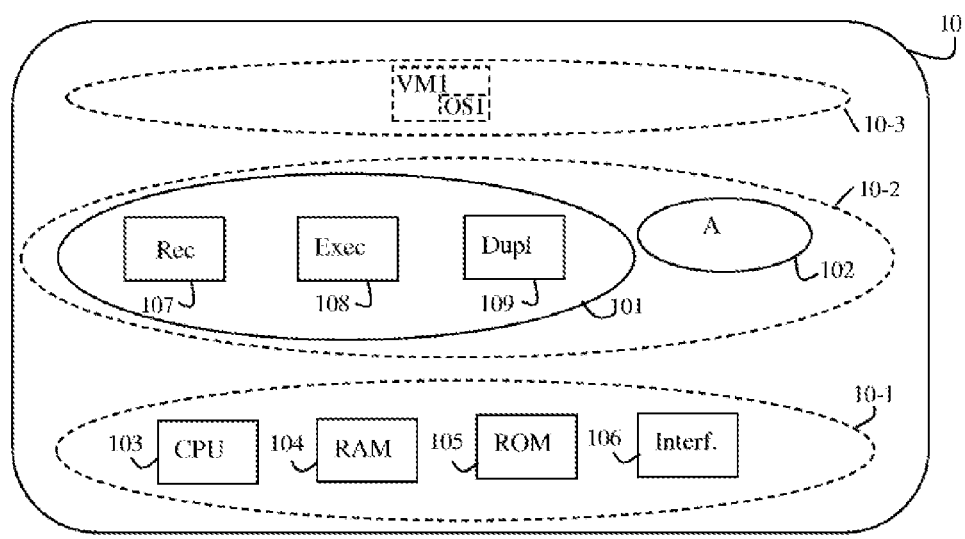
FIG. 4 is a diagrammatic representation of a virtual machine security monitoring device according to one embodiment of the invention.

A device according to one embodiment of the invention for monitoring the security of a virtual machine will now be described with reference to FIG. 4.

A monitoring device 10 is a computer device such as a terminal or a server. According to the architecture model described with reference to FIG. 1, the monitoring device is a host server 10 adapted to host client virtual machines, for example the virtual machine VM1 (represented in dashed outline in FIG. 4). The monitoring device 10 includes a virtualization layer 10-2 intended to host a security agent 102 and a hypervisor 101. The hypervisor 101 is adapted to virtualize resources of the host server 10 in order to supply the virtual machine VM1 with the resources it needs.

In the conventional way the monitoring device 10 includes:
  a microprocessor 103 or "CPU" (from the English "Central Processing Unit"), intended to load instructions into memory, to execute them, to carry out operations,
  a set of memories, including a volatile memory 104, or "RAM" ("Random Access Memory") used to execute code instructions, store variables, etc.,
  a storage memory 105 of "ROM" or "EEPROM" type (from the English "Read-Only Memory" and "Electronically-Erasable Programmable Read-Only Memory"). The storage memory 105 is adapted to store applications that include code instructions for executing the steps of the monitoring method executed by the monitoring device. In particular, it stores code instructions for implementing the hypervisor 101 and the security agent 102 in the virtualization layer 10-2. In this embodiment described here, the security agent 102 is separate from the hypervisor 101. In another embodiment, the security agent 102 is part of the hypervisor;
  communication interfaces 106 so that the entities can communicate. In particular, the interfaces 106 are adapted to facilitate communication with the security agent 102, the virtual machine VM1 and its operating system OS1, etc. The communication interfaces 106 are also adapted to access the client database 11 (not represented in FIG. 4).

Clearly, given the description of the cloud computing model given with reference to FIG. 1, the microprocessor 103, the memories 104, 105, the communication interfaces 106 are hardware resources that belong to the hardware execution layer 10-1. These resources are intended to be virtualized by the hypervisor 101 and to be made available to virtual machines in virtualized form.

The monitoring device 10 also includes:
- receiving means 107 adapted to receive from the operating system of the virtual machine VM1 at least one associated machine instruction corresponding to an interrupt in the operating system, said interrupt following an event that has occurred in the virtual machine. The receiving means 107 are adapted to execute the steps E3 and E1' of the monitoring method described above;
- means 108 for executing the interrupt, adapted to execute said instruction using the hardware resources of the host system. The result of the execution of this sequence, intended to be sent to the operating system OS1 of the virtual machine VM1, constitutes a data stream. The means 108 for executing the interrupt are adapted to execute the steps E4 and E2' of the monitoring method described above;
- duplication means 109 adapted to duplicate the received stream as a second stream. The duplication means 109 are adapted to execute the steps E5 and E3' of the monitoring method described above;
- the security agent 102, separate from the virtual machine VM1, adapted to process and to monitor the second stream to detect a security problem during the processing of the interrupt. The security agent 102 is adapted to execute the steps E6 and E4' of the monitoring method described above.

The communication interfaces 106, the receiving means 107, the means 108 for executing the interrupt, the duplication means 109, the security agent 102 and the hypervisor 101 are preferably software modules containing software instructions for executing the steps of the monitoring method described above.

The invention therefore also concerns:
- a computer program including instructions for executing the security monitoring method as described above when this program is executed by a processor of the monitoring device 10,
- a readable storage medium on which the computer program described above is stored.

The software modules may be stored in or transmitted by means of a data medium. This may be a hardware storage medium, for example a CD-ROM, a magnetic diskette or a hard disk, or a transmission medium such as a signal or a telecommunication network.

In another embodiment, corresponding to the situation in which the virtual machine VM1 is duplicated as a virtual machine VM1', the monitoring device 10 also includes:
- second duplication means (not represented in FIG. 4), adapted to duplicate the virtual machine VM1 as the duplicated virtual machine VM1', and
- installation means (not represented), adapted to install the security agent 102 on the duplicated machine VM1'.

The invention claimed is:

1. A method for security monitoring of a virtual machine hosted by a host system, the virtual machine comprising an operating system communicating with a hypervisor of the host system, said hypervisor interfacing between the operating system and hardware resources of the host system, said method comprising the following processes executed by the hypervisor:
- duplicating the virtual machine as a duplicated virtual machine, the duplicated virtual machine having a security agent installed thereon;
- receiving from the operating system at least one machine instruction corresponding to an interrupt in the operating system, said interrupt following an event that has occurred in the virtual machine; and
- executing the instruction using the hardware resources of the host system and sending to the operating system a data stream including the result of executing the instruction;
- wherein the sent data stream is duplicated in a second stream and the second stream is sent to the duplicated virtual machine and analyzed by the security agent installed on the duplicated virtual machine in order to detect a security problem during the processing of the interrupt.

2. The security monitoring method as claimed in claim 1 wherein the stream duplication, stream sending and instruction execution processes are executed atomically.

3. A device for security monitoring of a virtual machine hosted on said device and including an operating system communicating with a hypervisor of the host system, said hypervisor interfacing between the operating system and hardware resources of the host system, said device comprising a processor and a memory, the device being configured to:
- duplicate the virtual machine as a duplicated virtual machine, the duplicated virtual machine having a security agent installed thereon
- receive from the operating system at least one associated machine instruction corresponding to an interrupt in the operating system, said interrupt following an event that has occurred in the virtual machine;
- execute said instruction using the hardware resources of the host system and send to the operating system a stream including the result of executing said instruction;
- duplicate the stream as a second stream; and
- execute the security agent installed on the duplicated virtual machine to analyze the second stream in order to detect a security problem when processing the interrupt.

4. A security monitoring system including:
- the security monitoring device of claim 3;
- the virtual machine; and
- the duplicated virtual machine having the security agent installed theron.

5. A computer comprising a processor and a memory, the computer having stored thereon instructions, which when executed by said computer, cause said computer to perform a method for security monitoring of a virtual machine hosted by a host system, the virtual machine comprising an operating system communicating with a hypervisor of the host system, said hypervisor interfacing between the operating system and hardware resources of the host system, said method comprising the following processes:
- duplicating the virtual machine as a duplicated virtual machine, the duplicated virtual machine having a security agent installed thereon;
- receiving from the operating system at least one machine instruction corresponding to an interrupt in the operating system, said interrupt following an event that has occurred in the virtual machine; and executing the instruction using the hardware resources of the host system and sending to the operating system a data stream including the result of executing the instructions;

wherein the sent data stream is duplicated in a second stream and the second stream is sent to the duplicated virtual machine and analyzed by the security agent installed on the duplicated virtual machine in order to detect a security problem during the processing of the interrupt.

6. A non-transitory computer readable medium having stored thereon instructions, which when executed by a computer, cause said computer to perform a method for security monitoring of a virtual machine hosted by a host system, the virtual machine comprising an operating system communicating with a hypervisor of the host system, said hypervisor interfacing between the operating system and hardware resources of the host system, said method comprising the following processes:

duplicating the virtual machine as a duplicated virtual machine, the duplicated virtual machine having a security agent installed thereon;

receiving from the operating system at least one machine instruction corresponding to an interrupt in the operating system, said interrupt following an event that has occurred in the virtual machine; and executing the instruction using the hardware resources of the host system and sending to the operating system a data stream including the result of executing the instruction;

wherein the sent data stream is duplicated in a second stream and the second stream is sent to the duplicated virtual machine and analyzed by the security agent installed on the duplicated virtual machine in order to detect a security problem during the processing of the interrupt.

* * * * *